J. H. WELSH.
CLUTCH PEDAL.
APPLICATION FILED JULY 8, 1916.
1,216,028.
Patented Feb. 13, 1917.
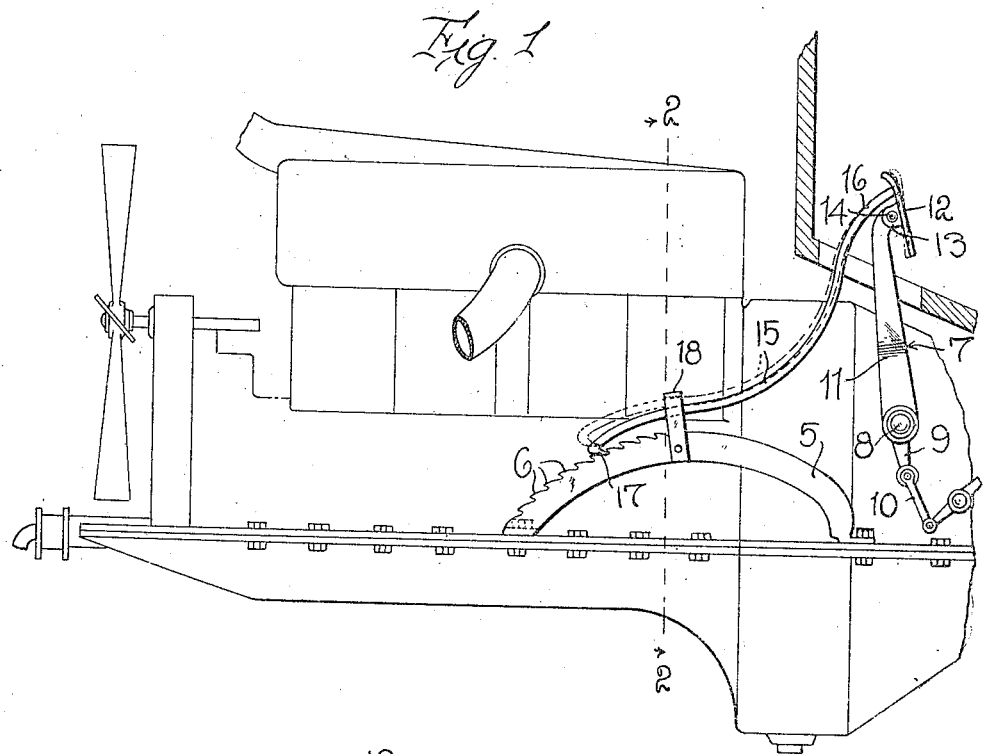
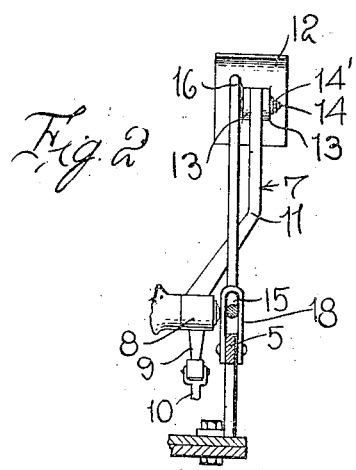
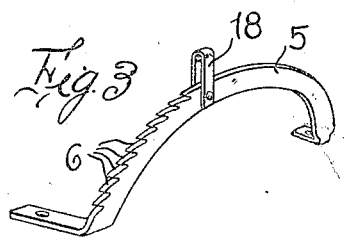
Inventor
J. H. WELSH
By Watson E. Coleman
Attorney

UNITED STATES PATENT OFFICE.

JACKSON H. WELSH, OF HAZELTON, WEST VIRGINIA.

CLUTCH-PEDAL.

1,216,028. Specification of Letters Patent. Patented Feb. 13, 1917.

Application filed July 8, 1916. Serial No. 108,148.

*To all whom it may concern:*

Be it known that I, JACKSON H. WELSH, a citizen of the United States, residing at Hazelton, in the county of Preston and State of West Virginia, have invented certain new and useful Improvements in Clutch-Pedals, of which the following is a specification, reference being had to the accompanying drawings.

This invention relates to an improved pedal lever for actuating the speed changing clutch of a planetary power transmission gearing for motor vehicles, and is more particularly designed for use in connection with the Ford type of automobiles.

Generically stated, it is the primary purpose of the present invention to provide means operable independently of the emergency brake for holding the clutch in high or low gear or in a neutral position.

It is another important object of the invention to provide a simple and effective locking device for the pedal bar operable by means of the foot to release the bar, whereby the same may be actuated and the clutch shifted.

It is a further general object of my invention to provide a device for the above purpose which is simple and durable in its construction, and may be manufactured and installed in a motor vehicle of the type referred to at relatively small cost.

With the above and other objects in view, my invention consists in the novel features of construction, combination and arrangement of parts to be hereinafter more fully described, claimed, and illustrated in the accompanying drawing, in which—

Figure 1 is a side elevation of my improved pedal lever and locking means therefor, the locking or holding rod being shown in an operative position in full lines and in an inoperative position in dotted lines.

Fig. 2 is a transverse sectional view on the line 2—2 of Fig. 1, and

Fig. 3 is a detail perspective view of the locking bar employed.

Referring in detail to the drawing, 5 designates the rack bar which is of curved or arcuate form and is bolted or otherwise suitably secured at its opposite ends upon one of the side flanges of the engine casing. This rack bar is provided upon its upper edge with the spaced teeth indicated at 6.

The pedal bar 7 extends through an opening in the floor of the vehicle and is fulcrumed at its lower end beneath the vehicle floor as shown at 8. This end of the pedal bar is formed with a depending arm 9 to which the clutch shifting rod 10 is suitably connected in the usual manner. The lower end portion of the pedal bar 7 is offset, as indicated at 11 so that the upper end of said bar which operates in a slot in the vehicle floor, will extend in proper position relative to the rack bar 5.

12 designates a foot plate preferably of rectangular form to one side of which the spaced ears 13 are secured. The upper end of the pedal bar 7 is laterally curved and provided with an opening to loosely receive a bolt 14, extending through the spaced ears 13. A suitable retaining nut 14' is threaded upon one end of this bolt. Thus it will be understood that the foot plate 12 is pivotally mounted upon the upper end of the pedal bar so that it may freely oscillate thereon.

A locking or holding rod 15 is offset at one end, as at 16, the terminal of said offset portion being threaded for engagement in a threaded opening formed in the foot plate 12 above the spaced ears 13 on said plate. The major portion of this rod 15 is longitudinally curved and substantially of the same arc or radius as the rack bar 5 and is adapted for shifting movement over said rack bar. The other or free end of the rod 15 is formed with an angularly disposed lug or hook 17 for engagement with the teeth 6 on the rack bar. An upwardly projecting guide loop 18 is securely fixed to the rack bar 5 and through the same the curved portion of the rod 15 moves. This guide loop acts as a stop to limit the upward movement of the rod 15 when the hook or lug 17 thereon is disengaged from the rack teeth 6. My improved clutch shifting pedal above described, is preferably designed for use in connection with planetary transmission gearing, such as is employed upon the Ford type of automobiles, and in such use the emergency brake actuating means is disengaged from the clutch operating rod, and a separate lever provided for the operation of the brake. Thus, in the operation of my improved pedal lever, the clutch may be shifted and held in high or low gear or in a neutral position without applying the emergency brake. In crowded traffic where it is essential that the clutch shifting lever shall be at all times under the instant control of the operator, it is only necessary to exert a pressure with the foot upon the lower end portion of the plate 14 so as to oscillate said plate upon the upper end of the pedal bar 7 and thus lift the rod 15, disengaging the hook or lug 17 thereof from the teeth on the rack bar. While holding the rod 15 in this inoperative position, the pedal lever may be actuated to shift the clutch in the proper direction to start or stop the machine, said rod moving freely through the guide loop 18 on the rack bar. In ascending long hills, the clutch may be shifted into low gear, and held in such position by releasing the pressure on the foot plate 14 so that the hook or lug 17 on the rod 15 will drop into engagement with one of the rack teeth 6 and thus hold the pedal against further movement and permit the operator to remove his foot.

From the foregoing description taken in connection with the accompanying drawing, it is believed that the construction, manner of use and several advantages of my invention will be clearly and fully understood. The device consists of very few parts which are all of simple form, and while the pedal bar may be securely held in its adjusted position, the speed changing clutch is at the same time under the instant control of the operator, as said pedal bar can be immediately released simply by pressure of the foot upon the plate 14, and actuated to shift the clutch. In traveling on high or low speed, on an open road, the operator is relieved of considerable discomfort due to the necessity of retaining the foot on the pedal by the provision of the means above described, whereby the pedal may be locked or held against movement. Thus it will be apparent that I have produced a very simple and convenient device and one which may be applied to the vehicle without necessitating any alterations therein or requiring any great amount of expense in its installation.

While I have shown and described the preferred construction and arrangement of the several elements provided, it will be understood that the device is susceptible of considerable modification therein and I therefore reserve the privilege of adopting all such legitimate changes as may be fairly embodied within the spirit and scope of the invention as claimed.

Having thus described this invention, what I claim is:—

1. The combination of a rack bar, a pedal bar fulcrumed at one end, a foot plate oscillatably mounted upon the other end of the pedal bar, a longitudinally curved rod fixed at one of its ends to said foot plate above and adjacent to the fulcrum of said foot plate, said rod being longitudinally movable over the rack bar and having a terminal tooth for engagement with the teeth of said bar, said rod being moved to an inoperative position by pressure on one end of the foot plate, and means on the rack bar for limiting the latter movement of said rod.

2. The combination of a rack bar, a pedal bar fulcrumed at one end, a foot plate oscillatably mounted upon the other end of the pedal bar, a rod rigidly connected at one of its ends to said foot plate and provided with means on its other end for locking engagement with the teeth of the rack bar, said rod being moved with respect to the rack bar to an inoperative position by pressure upon one end of the foot plate, and a guide for said rod fixed upon the rack bar and acting as a stop to limit the movement of said rod to an inoperative position.

3. The combination of a rack bar provided with spaced teeth upon its upper edge, a clutch shifting pedal bar fulcrumed at one of its ends, a foot plate oscillatably mounted upon the other end of said pedal bar, a rod having an offset end fixed to said foot plate and provided with a curved portion extending over the upper edge of the rack bar, said rod having a lug on its free end for engagement with the rack teeth, said rod being adapted to be lifted and the lug disengaged from the rack teeth by pressure upon one end of the foot plate, and a guide loop through which said rod is movable in the actuation of the pedal bar, said loop limiting the upward movement of the rod to an inoperative position.

In testimony whereof I hereunto affix my signature in the presence of two witnesses.

JACKSON H. WELSH.

Witnesses:
  A. D. JOHNSON,
  J. B. RAUCH.